United States Patent
Schaefer

(10) Patent No.: US 6,203,203 B1
(45) Date of Patent: Mar. 20, 2001

(54) SLIDE BEARING HAVING A BEARING BLOCK AND A BEARING CAP

(75) Inventor: Helmut Schaefer, Kernen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/382,829

(22) Filed: Aug. 25, 1999

(30) Foreign Application Priority Data

Aug. 26, 1998 (DE) .................................. 198 38 745

(51) Int. Cl.⁷ ...................................................... F16C 9/04
(52) U.S. Cl. ............................................ 384/432; 384/294
(58) Field of Search .................................. 384/294, 288, 384/429, 430, 431, 432, 433, 434; 123/195 R

(56) References Cited

U.S. PATENT DOCUMENTS

| | | | |
|---|---|---|---|
| 2,850,334 | * 9/1958 | Hurley | 384/294 |
| 4,643,145 | * 2/1987 | Bolton et al. | 123/195 R |
| 4,684,267 | * 8/1987 | Fetouh | 384/294 |
| 4,884,900 | * 12/1989 | Pirault et al. | 384/434 |
| 5,551,782 | 9/1996 | Arnhold et al. | 384/294 |
| 5,730,097 | * 3/1998 | Aoyama | 384/288 X |

FOREIGN PATENT DOCUMENTS

| | | |
|---|---|---|
| 25 56 203 | 6/1978 | (DE) . |
| 43 03 592 | 8/1994 | (DE) . |

* cited by examiner

*Primary Examiner*—Thomas R. Hannon
(74) *Attorney, Agent, or Firm*—Evenson, McKeown, Edwards & Lenahan, P.L.L.C.

(57) ABSTRACT

A slide bearing, which is to be used particularly as a crankshaft main bearing of an internal-combustion engine, has a bearing block and a bearing cap. The bearing cap is constructed of a different material than the bearing block. The slide bearing has a bearing layer which is firmly connected with it and consists of a material which is softer than that of the bearing cap and that of the bearing block.

7 Claims, 2 Drawing Sheets

SLIDE BEARING HAVING A BEARING BLOCK AND A BEARING CAP

BACKGROUND AND SUMMARY OF THE INVENTION

This application claims the priority of German patent 198 38 745.8, filed Aug. 26, 1998, the disclosure of which is expressly incorporated by reference herein.

The invention relates to a slide bearing, particularly as a crankshaft main bearing of an internal-combustion engine, having a bearing block and a bearing cap. The invention also relates to a process for manufacturing a slide bearing.

Divisible slide bearings, particularly as crankshaft main bearings, are generally known into which a bush made of a typical slide bearing material or a metal sheet coated with such a material is inserted. These bushes or sheet metal inserts, which must also be constructed in a divisible manner, permit a uniform distribution of the bearing load over the bearing surface of the bearing eye. However, oil carbon can easily form between the inserted bushes and the bearing eye or the shaft.

Furthermore, the bushes compensate for machining inaccuracies which can virtually not be avoided when the bearing eye is manufactured. Particularly if the materials of the bearing block and of the bearing cap differ—for example, between an aluminum diecast bearing block of a crankshaft main bearing constructed in one piece with the crankcase and a steel cast bearing cap—the manufacturing of a round bearing eye is virtually impossible. In order to be able to machine the bearing eye, the bearing cap and the bearing block of the respective bearing are already joined before the machining. For this reason, for example, during the turning or during the mandrel honing, the blades of the machining tool must be able to machine aluminum as well as steel in the same cut. Because of the different characteristics of the materials of the bearing cap and of the bearing block, particularly the required cutting forces, after the machining, the bearing eyes always deviate slightly from a round shape (e.g., the bearing eyes may have an oval shape).

German Patent Document DE 43 03 592 A1 indicates that it is possible to do completely without a bearing bush. It illustrates a connecting rod to which a special bearing layer is applied in the area of its finished bearing eyes. Then, the connecting rod, together with the bearing layer, is separated by cracking, and connecting rod eyes are obtained which are ready to be mounted, are divided into two parts and have ideal bearing characteristics by means of the coating with a bearing layer made of a suitable bearing material. A similar technique is described in German Patent Document DE 26 56 203 C2.

Since, however, in the case of connecting rods, both parts of the bearing eyes, thus the bearing cover and the bearing block, consist of the same material, no problems or only slight problems occur with respect to deviations from roundness caused by the manufacturing.

It is therefore an object of the invention to provide a slide bearing with a divisible bearing eye, in which a bearing block and a bearing cap are made of different materials, and which has minimal deviations from roundness of the bearing eye and ideal bearing characteristics. It is also an object of the invention to provide a process for manufacturing such a slide bearing.

According to the invention, these and other objects have been achieved by a slide bearing for an internal-combustion engine, comprising: a bearing block; and a bearing cap, the bearing block and the bearing cap being made of different materials, each of the bearing block and the bearing cap having a bearing surface wherein the slide bearing has a bearing layer made of a bearing material which is fixedly connected with the slide bearing, the bearing layer at least approximately completely covering the bearing surfaces of the bearing cap and of the bearing block.

According to the invention, these and other objects have been achieved by an internal-combustion engine crankcase, comprising the slide bearing of claim 1 as a crankshaft main bearing.

According to the invention, these and other objects have been achieved by a method of manufacturing a slide bearing, for an internal-combustion engine, having a bearing block and a bearing cap, the bearing block and the bearing cap being made of different materials, said method comprising: the bearing cap and the bearing block of the slide bearing with one another; machining bearing surfaces of a bearing eye of the slide bearing such that a maximal roundness deviation remains which is smaller than a desired thickness of a planned bearing layer; applying the bearing layer to the bearing surface of the bearing eye; cracking the bearing layer and demounting the bearing cap from the bearing block; reconnecting the bearing cap and the bearing block of the slide bearing with one another; and machining the bearing layer.

The coating of the bearing with a bearing layer made of a suitable bearing material provides ideal bearing characteristics of the slide bearing and the generation of noise can clearly be reduced. In addition, an oil carbon formation can be prevented by means of the bearing layer fixedly connected with the bearing eye.

The parts of the slide bearing, specifically the bearing block and the bearing cap, which are fixedly connected with one another for a machining of the bearing eye, after the machining, are very advantageously coated with a bearing layer made of a bearing material, this bearing material generally being softer than the material of the bearing cap and of the bearing block. The bearing layer is advantageously applied so that its layer thickness is larger than the maximal roundness deviations which have remained after the mechanical machining of the bearing eye. After the demounting of the bearing cap, in which case the soft bearing layer is broken apart (cracked), the bearing cap is again mounted on the bearing block. The precision machining, which follows, for example, precision turning or mandrel honing, can thus take place under very advantageous conditions. Since only portions of the previously applied soft bearing layer are removed, the cutting forces remain low and homogeneous cutting conditions exist along the complete surface of the bearing eye, whereby high manufacturing accuracies can be achieved.

During the mounting after the cracking of the bearing layer, burrs may possibly occur on the abutting surfaces of the bearing layer which now project into the interior of the bearing eye. During the precision machining of the bearing eye, any burrs which occur are removed again. Thus a bearing eye is obtained which has a homogeneous bearing surface and very low deviations from roundness.

Other objects, advantages and novel features of the present invention will become apparent from the following detailed description of the invention when considered in conjunction with the accompanying drawings.

DETAILED DESCRIPTION OF THE DRAWINGS

Figure 1:
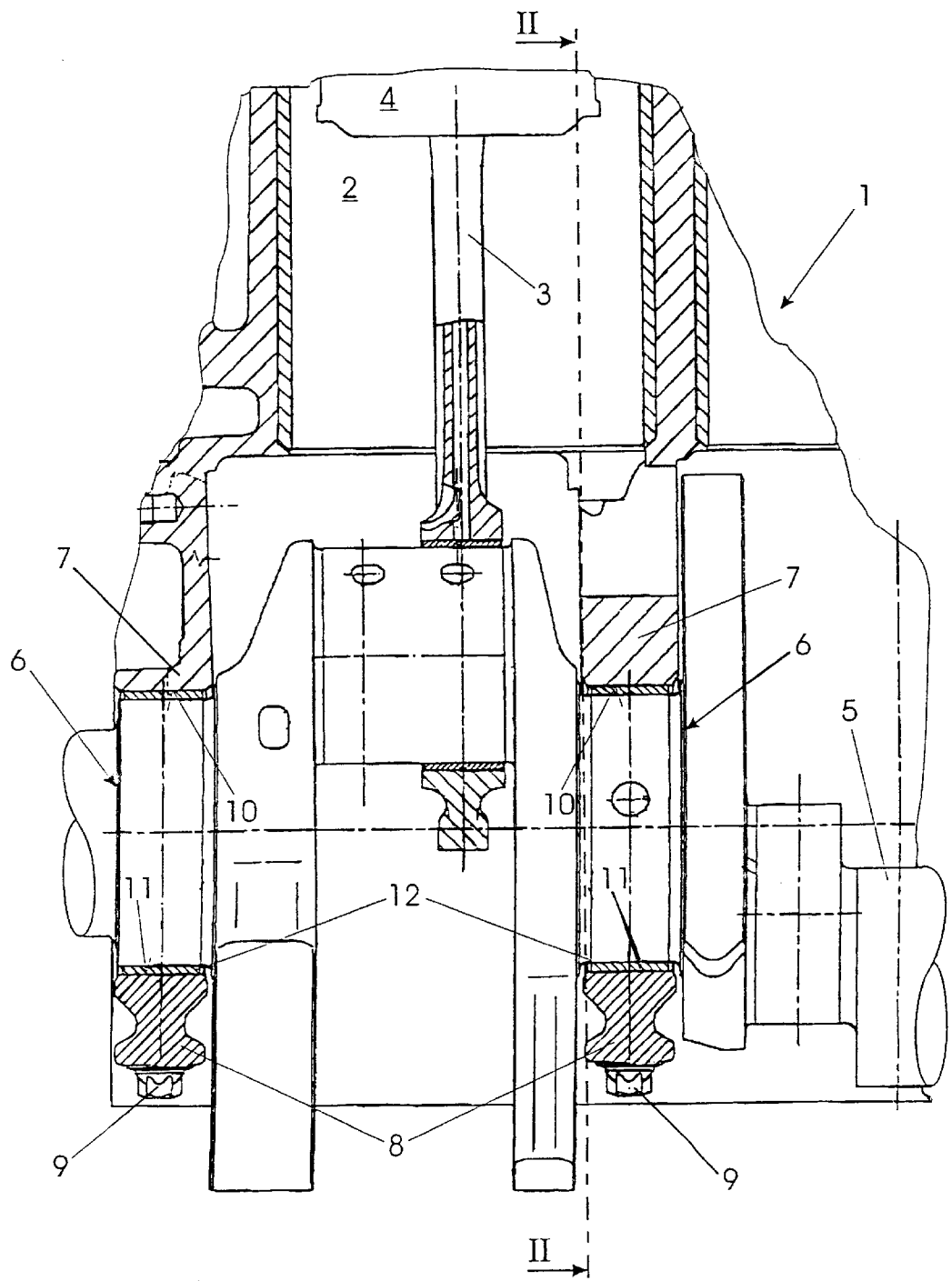
FIG. 1 is a partial sectional view of a crankcase with a portion of a crankshaft and two crankshaft main bearings according to a preferred embodiment of the present invention.

FIG. 1 is a partial sectional view of a part of a crankcase 1. A connecting rod 3 and a piston 4 (shown only partially) are located in a cylinder 2 (shown only partially). In the lower part of the crankcase, a crankshaft 5 is situated which is disposed in several slide bearings 6. In this case, the slide bearings 6 are particularly crankshaft main bearings 6, of which only two are illustrated in FIG. 1. Each of these crankshaft main bearings 6 includes a bearing block 7, which is constructed in one piece with the crankcase 1, and of a bearing cap 8, which is connected with the bearing block 7 via at least one fastening element 9.

A bearing layer 12 consisting of a soft bearing material known in the art is applied to a bearing surface 10 of the bearing block 7 or to a bearing surface 11 of the bearing cap 8. This bearing layer 12 is made of a bearing material, which ideally or as its main constituent contains tin. According to certain preferred embodiments, the bearing layer 12 will have a thickness of between 100 µm and 250 µm, after the application. In order to be able to recognize it at all in the drawing figures, the bearing layer 12 is therefore shown extremely enlarged (i.e., is not drawn to scale).

Figure 2:
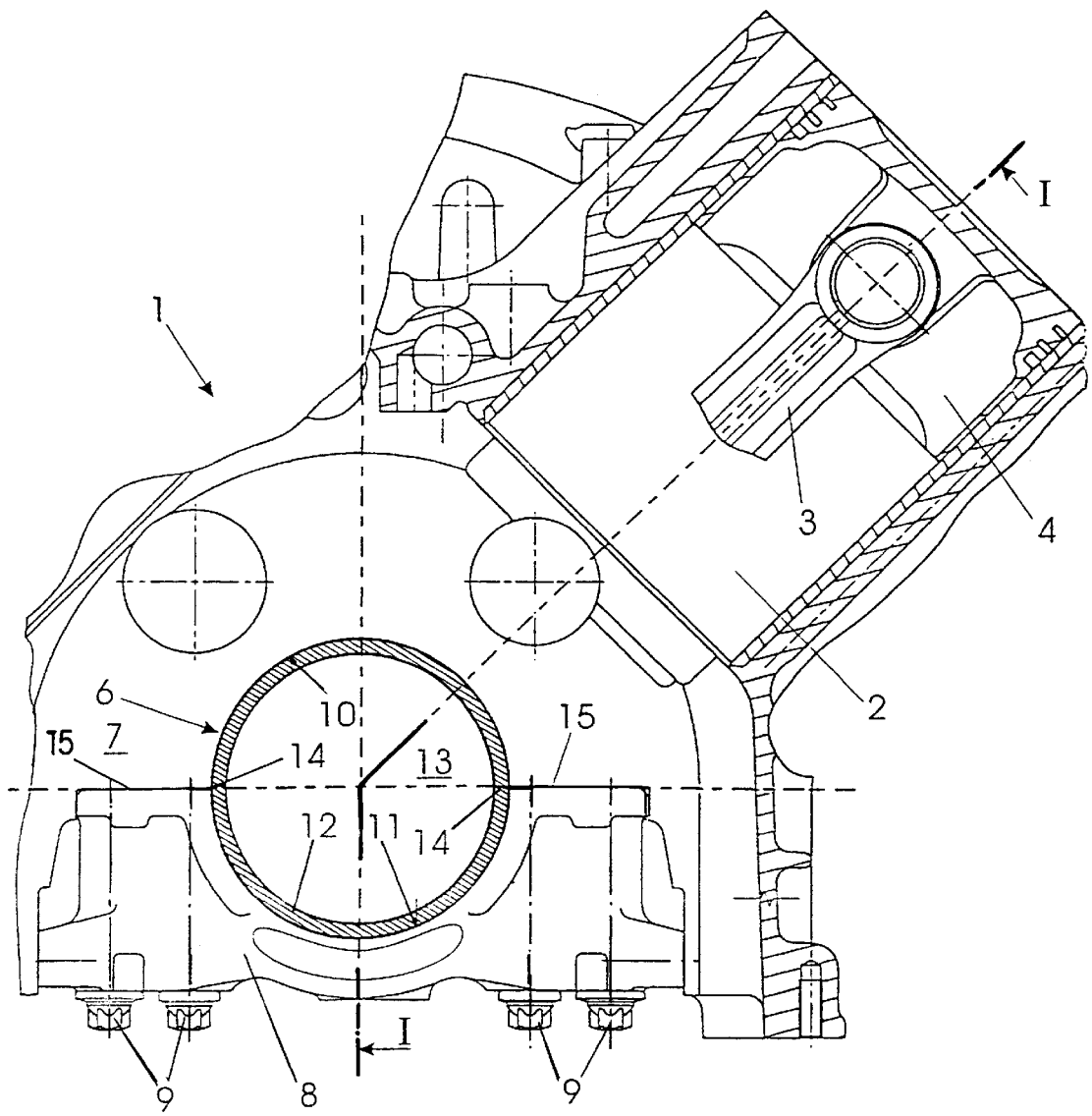
FIG. 2 is a sectional view of the crankcase of FIG. 1 along Line II—II.

FIG. 2 shows the crankcase 1 in a section taken along Line II—II of FIG. 1. In this case, a bearing eye 13 of the crankshaft main bearing 6 is shown without the mounted crankshaft 5. The bearing layer 12 has breaking surfaces 14 which extend approximately as an extension of a joint 15 between the bearing block 7 and the bearing cap 8. These breaking surfaces 14 are formed when the bearing layer 12 is cracked when the bearing cap 8 is demounted. The breaking surfaces 14 enable the bearing cap 8 to be fixed during the final mounting in the longitudinal direction of the crankcase 1, similar to the breaking surfaces of cracked bearing components which were originally in one piece (such as a connecting rod bearing "violin" or a large connecting rod bearing eye).

During the manufacturing of the crankshaft main bearing 6, the bearing cap 8 and the bearing block 7 are fixedly connected with one another by way of the connection elements 9. This should take place in the same manner, in the case of screwed connections 9, particularly with the same tightening torque, which is also used later during the final mounting of the crankshaft main bearing 6.

By machining the bearing eye 13 by using known manufacturing processes, such as turning and mandrel honing, this bearing eye 13 is then shaped to its final diameter, minus the planned thickness of the bearing layer 12. Since the blades of the machining tools must machine the bearing block 7 (e.g., made of aluminum) and the bearing cap 8 (e.g., made of steel) in the same cut, a deviation from the round shape (e.g., an oval shape) after the machining of the bearing eye 13 cannot be avoided.

The bearing layer 12 is then applied to the two different materials of the bearing cap 8 and of the bearing block 7 in the mounted condition, for example, by way of plasma spraying. This layer 12 is therefore fixedly, particularly non-rotatably, connected with the bearing eye 13. The bearing layer 12 is of a thickness covers the roundness deviations which occur in the bearing eye 113, which usually amount to only a few micrometers (µm). For example, the bearing layer 12 may have a thickness in the range of 100 µm tp 250 µm. After the cracking of the bearing layer 12 and another mounting of the bearing block 7 and of the bearing cap 8, a final precision machining of the bearing layer 12 takes place which can thereby be removed to a residual thickness of approximately 50 µm to 100 µm. All deviations from the roundness of the bearing eye 13 and the burrs, which may have occurred during the mounting of the cracked soft bearing layer 12, are thereby eliminated.

As an alternative, each of the bearing block 7 and the bearing cap 8 can be provided in a known manner with a respective chamfer at the end points of the joint 15 facing the bearing eye 13. A possibly formed burr can therefore not project into the interior of the bearing eye 13 but exists in a significantly weakened manner in the radial direction. As a result, a residual burr which may remain after the machining also presents a risk to a perfect functioning of the slide bearing 6.

When the crankshaft main bearing 6 is completely mounted, the remaining thickness of the bearing layer 12 of from 50 µm to 100 µm permits a uniform distribution of the bearing load over the bearing surface 10, 11 of the bearing eye 13 and optimal running characteristics of the crankshaft 5 in the crankshaft main bearings 6.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Slide bearing for an internal-combustion engine, comprising: a bearing block; and a bearing cap, the bearing block and the bearing cap being made of different materials, each of the bearing block and the bearing cap having a bearing surface wherein the slide bearing has a bearing layer made of a bearing material which is fixedly connected with the slide bearing, the bearing layer at least approximately completely covering the bearing surfaces of the bearing cap and of the bearing block.

2. Slide bearing according to claim 1, wherein a bearing eye defined by the bearing cap and the bearing block, said bearing eye has roundness deviations remaining after machining, the bearing layer having a thickness which is larger than said roundness deviations.

3. Slide bearing according to claim 1, wherein the bearing layer has a thickness in the range of 50 µm to 250 µm.

4. Slide bearing according to claim 1, wherein in that the bearing layer comprises tin.

5. Slide bearing according to claim 1, wherein the bearing layer comprises lead.

6. Slide bearing according to claim 1, wherein said slide bearing is a crankshaft main bearing.

7. An internal-combustion engine crankcase, comprising the slide bearing of claim 1 as a crankshaft main bearing.

* * * * *